US 8,155,635 B2

United States Patent
Hsieh et al.

(10) Patent No.: US 8,155,635 B2
(45) Date of Patent: Apr. 10, 2012

(54) METHOD FOR HANDLING INCOMING CALL IN SCREEN LOCK STATE, COMMUNICATION DEVICE AND RECORDING MEDIUM THEREOF

(75) Inventors: Chin-Ying Hsieh, Taoyuan County (TW); Sih-Jie Gu, Taoyuan County (TW); Drew Bamford, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 591 days.

(21) Appl. No.: 12/348,916

(22) Filed: Jan. 6, 2009

(65) Prior Publication Data

US 2009/0264117 A1 Oct. 22, 2009

(30) Foreign Application Priority Data

Apr. 17, 2008 (TW) ................. 97113961 A

(51) Int. Cl.
*H04M 3/00* (2006.01)
(52) U.S. Cl. ............. 455/418; 455/566; 455/414.1
(58) Field of Classification Search .............. 455/418, 455/414.1, 566
See application file for complete search history.

(56) References Cited

U.S. PATENT DOCUMENTS 6,961,559 B1 * 11/2005 Chow et al. .......... 455/414.1
7,627,535 B2 * 12/2009 Brockman et al. ........ 705/404
2005/0079896 A1 * 4/2005 Kokko et al. .......... 455/566
2008/0055263 A1 3/2008 Lemay et al.
2008/0189370 A1 * 8/2008 Adams et al. .......... 709/206
2008/0191905 A1 * 8/2008 Martin et al. .......... 341/24

FOREIGN PATENT DOCUMENTS

| CN | 1418029 | 5/2003 |
| CN | 1681279 | 10/2005 |
| CN | 1728856 | 2/2006 |

OTHER PUBLICATIONS

"First Office Action of China Counterpart Application", issued on Mar. 23, 2011, p1-p6.
"Second Office Action of China Counterpart Application", issued on Aug. 31, 2011, p1-p6.

* cited by examiner

*Primary Examiner* — David Q Nguyen
(74) *Attorney, Agent, or Firm* — Jianq Chyun IP Office

(57) ABSTRACT

A method for handling an incoming call in a screen lock state, a communication device and a recording medium thereof are provided. In the present method, when a communication device in a screen lock state receives an incoming call, the communication device exits the screen lock state and displays an incoming call frame. Then, the incoming call is handled according to an input instruction. After the completion of a handling of the incoming call, an idle time of the communication device that receives no operation is counted. When the idle time reaches a predefined value, the communication device returns to the screen lock state. As a result, a user may conveniently inspect and handle the incoming call even if the communication device is in the screen lock state.

23 Claims, 3 Drawing Sheets

300

METHOD FOR HANDLING INCOMING CALL IN SCREEN LOCK STATE, COMMUNICATION DEVICE AND RECORDING MEDIUM THEREOF

CROSS-REFERENCE TO RELATED APPLICATION

This application claims the priority benefit of Taiwan application serial no. 97113961, filed on Apr. 17, 2008. The entirety of the above-mentioned patent application is hereby incorporated by reference herein and made a part of specification.

BACKGROUND OF THE INVENTION

1. Field of the Invention

The present invention generally relates to a method for handling an incoming call, and more particularly, to a method for handling an incoming call in a screen lock state, a communication device, and a recording medium thereof.

2. Description of Related Art

Along with the development of technology, consumers can no longer be satisfied by an electronic device only integrating various functions. Besides a slim and elegant profile, operation convenience of the electronic device with multiple functions is also require so as to cope with increasingly stringent requirements of the customers. Taking a widely used mobile phone as an example, in early stage, a hardware keyboard is used as an input interface. However, the touch screen has features providing convenience, visible operation, durability, protection, and low cost, so the touch screen can used to replace the hardware keyboard by mobile phone manufacturers, so as to improve the convenience of operating the mobile phone.

Though it is convenient to operate the mobile phone via the touch screen, manufacturers of the mobile phones have to develop a mechanism for preventing unintended touch of the touch screen, so as to prevent activation of an unintended function caused by unintended touch of the touch screen. In other words, when the mobile phone is not operated, it may be set to a screen lock state, so as to turn off an input function of the touch screen. Such mechanism is essential when the mobile phone is put into a pocket or a bag. Once the mobile phone is set to the screen lock state, misdialing of the mobile phone then may be avoided.

For a smartphone with a built-in window Microsoft Windows Mobile OS, after entering the screen lock state, when an incoming call is received, a small scale window is popped up to prompt the user. Here, the user may answer or directly ignore the incoming call by operating a soft-key. After finishing the communication, the user must enter a main frame, and click a screen lock icon on the main frame, so as to set the smartphone to the screen lock state again. Therefore, if the user does not perform the screen lock state setting after finishing the communication, it is impossible to prevent the inconvenience caused by the screen mis-touch.

SUMMARY OF THE INVENTION

Accordingly, the present invention is directed to a method for handling an incoming call in a screen lock state, such that a user may conveniently handle the incoming call accordingly when a communication device is in the screen lock state, and the communication device is made to return to the screen lock state after the communication is ended.

The present invention is directed to a communication device, capable of displaying a full-screen incoming call frame when in the screen lock state and receiving the incoming call, such that it is convenient for the user to inspect the information of a calling party.

To achieve the aforementioned or other advantages, the present invention provides a method for handling an incoming call in a screen lock state, which is applicable to a communication device having a screen. First, the communication device in the screen lock state receives an incoming call. Then, the communication device exits the screen lock state and displays the incoming call frame, and handles the incoming call according to an input instruction. After finished a handling of the incoming call, the communication device counts an idle time that receives no operation instruction. When the idle time reaches a predefined value, the communication device returns the screen lock state.

In an embodiment of the present invention, the incoming call frame is a full screen frame and includes an incoming call information. The incoming call information at least includes a calling party image, a calling party name, or an incoming call number etc.

In an embodiment of the present invention, the screen of the communication device may be a touch screen, and after the step of displaying the incoming call frame, the method further includes receiving the input instruction through the touch screen.

In an embodiment of the present invention, the step of handling the incoming call according to the input instruction includes putting the incoming call through when the input instruction is an answering instruction. In addition, when receiving a communication end instruction, the incoming call is ended to finish the handling of the incoming call.

In an embodiment of the present invention, the step of handling the incoming call according to the input instruction includes ending the incoming call to finish the handling of the incoming call when the input instruction is a rejection instruction.

In an embodiment of the present invention, the step of handling the incoming call according to the input instruction includes entering a short message editing frame, when the input instruction is a short message writing instruction, and then leaving the short message editing frame to finish the handling of the incoming call. In addition, after the step of entering the short message editing frame, the method further includes establishing a short message through the short message editing frame, and sending the short message to a calling party of the incoming call.

In an embodiment of the present invention, the step of handling the incoming call according to the input instruction includes entering a short message editing frame to finish the handling of the incoming call when the input instruction is a short message writing instruction.

In an embodiment of the present invention, the method further includes directly returning to the screen lock state after finishing the handling of the incoming call.

The present invention provides a communication device, which includes a screen lock state switching module, an incoming call receiving module, a screen, and a processing module. The screen lock state switching module is used to switch a screen lock state of the communication device. The incoming call receiving module is used to receive an incoming call, and the screen is used to display an incoming call frame. The processing module is connected to the screen lock state switching module, the incoming call receiving module, and the screen, for ordering the screen lock state switching module to make the communication device exit the screen lock state, displaying the incoming call frame, and handling the incoming call according to an input instruction when the communication device in the screen lock state receives the incoming call. After finishing a handling of the incoming call, the processing module counts an idle time of the communication device that receives no operation, such that when the idle time reaches a predefined value, the processing module orders the screen lock state switching module to make the communication device enter the screen lock state.

In an embodiment of the present invention, the incoming call frame is a full screen frame and includes an incoming call information. The incoming call information may be a calling party image, a calling party name, or an incoming call number etc.

In an embodiment of the present invention, the screen is a touch screen for receiving the input instruction.

In an embodiment of the present invention, when it is determined that the input instruction is an answering instruction, the processing module puts the incoming call through. When a communication end instruction is received, the processing module ends the put-through incoming call, so as to finish the handling of the incoming call.

In an embodiment of the present invention, when it is determined that the input instruction is a rejection instruction, the processing module ends the incoming call to finish the handling of the incoming call.

In an embodiment of the present invention, the communication device further includes a short message editing module, coupled to the processing module, for switching and displaying a short message editing frame on the screen. When it is determined that the input instruction is a short message writing instruction, the processing module makes the short message editing module display the short message editing frame, and finishes the handling of the incoming call when leaving the short message editing frame.

In an embodiment of the present invention, the short message editing module is used to establish a short message, and send the short message to a calling party of the incoming call, so as to finish the handling of the incoming call accordingly.

In an embodiment of the present invention, when it is determined that the input instruction is the short message writing instruction, the processing module makes the short message editing module display the short message editing frame, so as to finish the handling of the incoming call.

In an embodiment of the present invention, after finishing the handling of the incoming call, the processing module is used to immediately order the screen lock state switching module to make the communication device enter the screen lock state.

The present invention provides a recording medium for recording a computer program. The computer program includes a plurality of program codes for being loaded to a communication device including a screen, and making the communication device execute a method for handling an incoming call in a screen lock state.

In the present invention, when the communication device in the screen lock state receives the incoming call, the communication device exits the screen lock state and the full-screen incoming call frame is displayed, such that it is convenient for the user to inspect and handle the incoming call. After finishing the handling of the incoming call, if the idle time of the communication device exceeds the predefined value, the screen lock state is returned. Accordingly, when the communication device is in the screen lock state, the user may also conveniently handle the incoming call, and avoid the screen mis-touch situation after the communication is ended.

In order to the make aforementioned and other objects, features and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
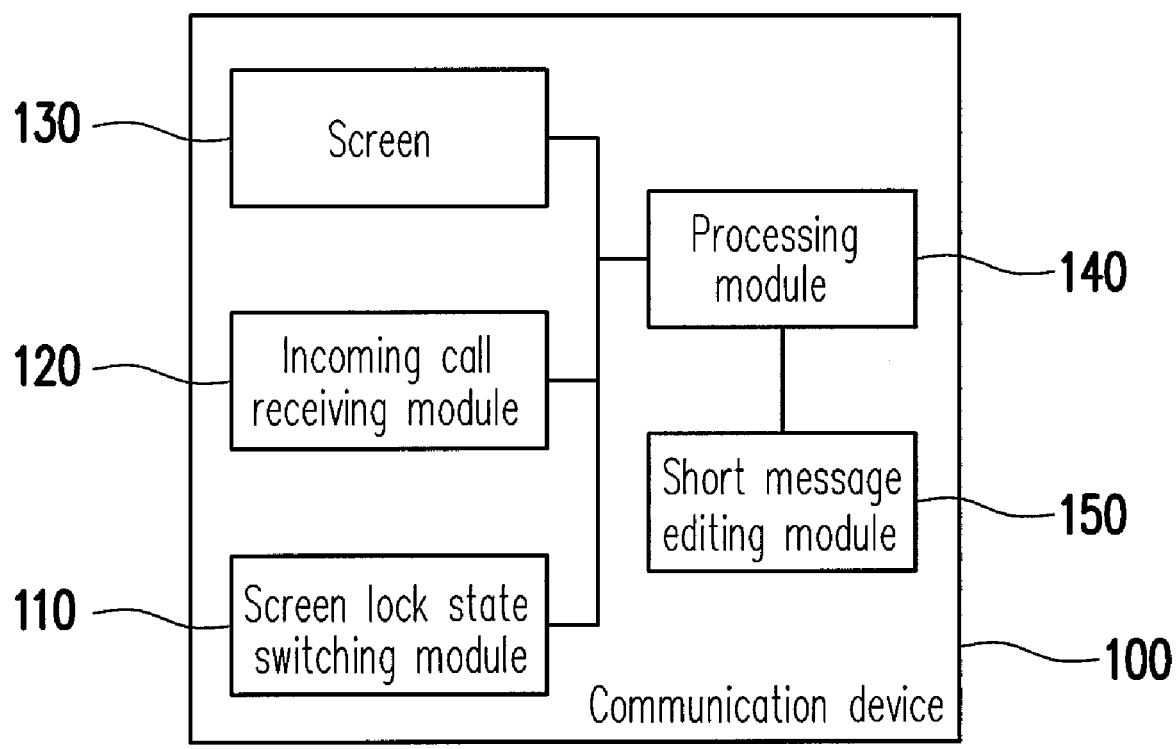
FIG. 1 is a block diagram of a communication device according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

In order to make the content of the present invention more clear, embodiments are described as follows to serve as the examples of which the present invention may be implemented accordingly.

FIG. 1 is a block diagram of a communication device according to an embodiment of the present invention. Referring to FIG. 1, a communication device 100 includes a screen lock state switching module 110, an incoming call receiving module 120, a screen 130, a processing module 140, and a short message editing module 150. The communication device 100 may be, but not limited to, a mobile phone, a PDA phone, a smartphone, or a touch phone etc.

The screen lock state switching module 110 is used to switch the screen lock state of the communication device 100. For example, the screen lock state switching module 110 may switch the communication device 100 from the operation state to the screen lock state, or from the screen lock state switch back to the operation state.

The incoming call receiving module 120 is, for example, a communication module capable of receiving or sending signals, and is used for receiving the incoming call dialed by others. The screen 130 is used to display various operating frames of the communication device 100 (such as the operating frame of application program or the incoming call frame). In this embodiment, the screen 130 may be a touch screen which can serve as a displaying interface and an input interface of the communication device 100 at the same time. The short message editing module 150 is used to switch and display the short message editing frame on the screen 130, so as to provide a user to write the message through the short message editing frame.

The processing module 140 is respectively connected to the screen lock state switching module 110, the incoming call receiving module 120, the screen 130, and the short message editing module 150, for ordering the screen lock state switching module 110 to control the communication device 100 to exit the screen lock state, displaying the incoming call frame on the screen 130, and then handling the incoming call according to the input instruction input by the user, when the communication device 100 in the screen lock state receives the incoming call. After finishing a handling of the incoming call, the processing module 140 begins to count an idle time of the communication device 100 that receives no operation instruction, accordingly when the idle time reaches a predefined value, the processing module 140 orders the screen lock state switching module 110 to switch the communication device 100 back to the screen lock state.

Figure 2:
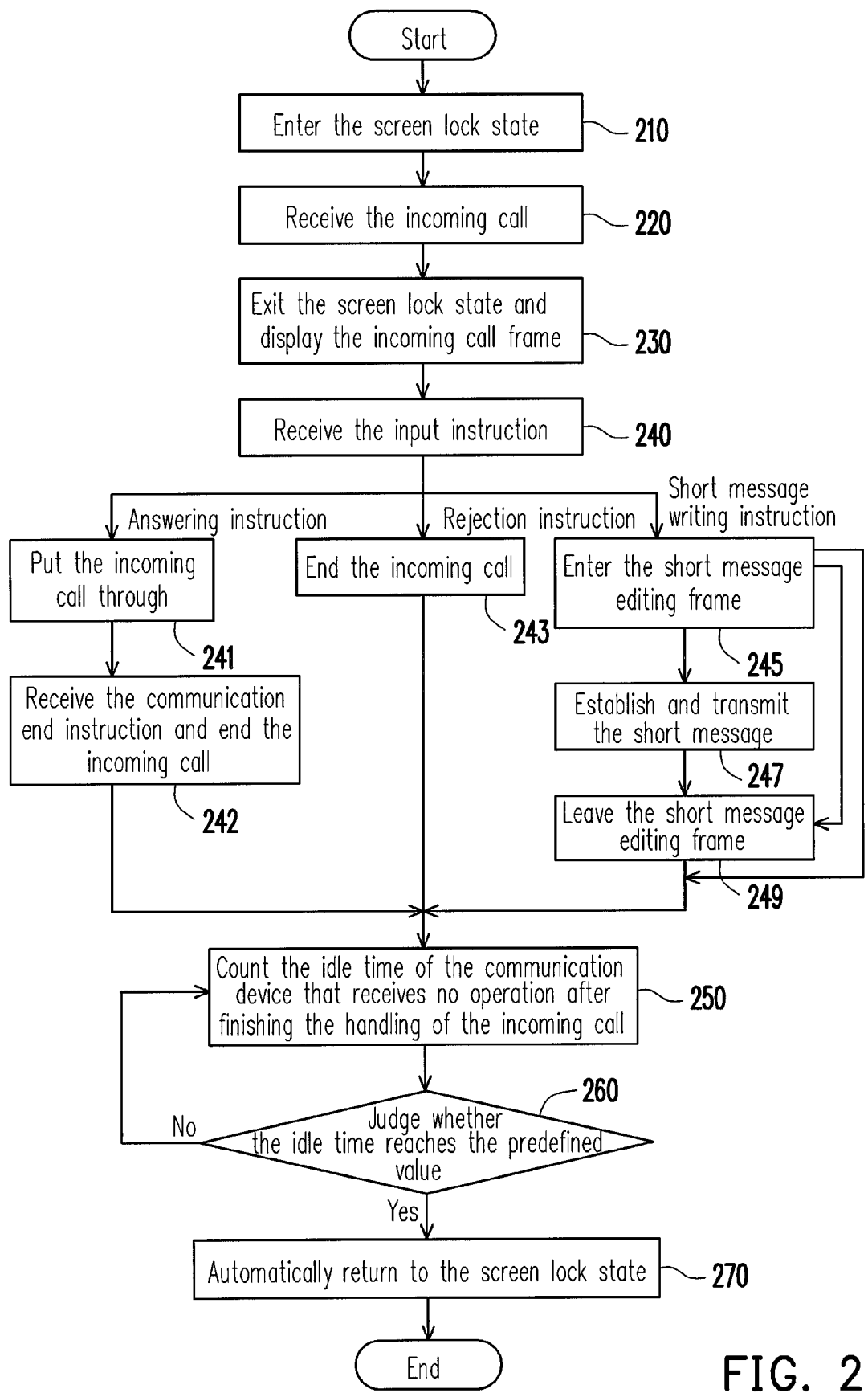
FIG. 2 is a flow chart of processes of a method for handling an incoming call in a screen lock state according to an embodiment of the present invention.

In order to further illustrate the flow of handling the incoming call by the communication device 100 in the screen lock state, another embodiment is provided in the following for more detailed illustration. In the present embodiment, it is assumed that the screen 130 is a touch screen. FIG. 2 is a flow chart of processes of a method for handling an incoming call in a screen lock state according to an embodiment of the present invention. Referring to FIGS. 1 and 2, first as shown in step 210, when the user does not need to operate the communication device 100 temporarily, the communication device 100 may be made to enter the screen lock state to prevent the problem brought from the screen 130 being mistouched.

Figure 3:
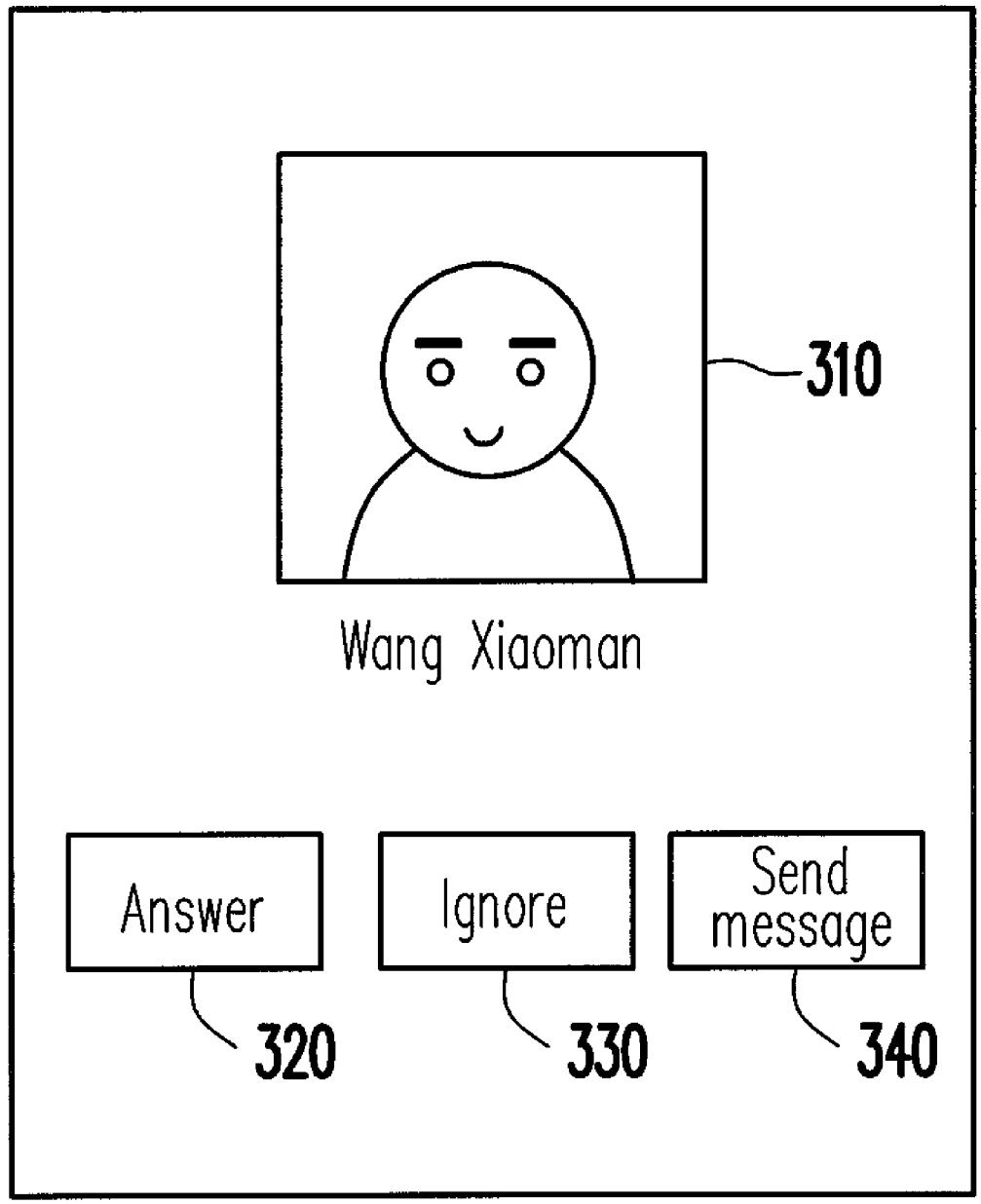
FIG. 3 is a schematic view of an incoming call frame according to an embodiment of the present invention.

When the communication device 100 is in the screen lock state, if the user touches the screen 130, any function will not be activated. However, as shown in step 220, in the screen lock state, the communication device 100 may still receive the incoming call signal through the incoming call receiving module 120. Here, as shown in step 230, according to the order of the processing module 140, the screen lock state switching module 110 controls the communication device 100 to exit the screen lock state. The processing module 140 may also display the incoming call frame on the screen 130. In this embodiment, the incoming call frame is, for example, a full screen frame displayed by totally covering the screen 130, and the incoming call frame may include, but not limited to, a calling party image, a calling party name, an incoming call number, and the like. For example, in the incoming call frame 300 as shown in FIG. 3, the calling party image 310 and the calling party name dialing the incoming call are displayed. The user may quickly recognize the identity of the calling party through the incoming call frame 300.

After the incoming call frame is displayed, next as shown in step 204, the input instruction is received through the screen 130, so as to perform different handling on the incoming call according to the input instruction. In this embodiment, the incoming call frame displayed by the processing module 140 is as shown by the incoming call frame 300, in addition to the calling party image 310 and the calling party name, three software press keys are displayed. The three software press keys are respectively an answer key 320, an ignore key 330, and a send message key 340. The user may click the above software press keys to accordingly send the corresponding input instruction to the processing module 140 of the communication device 100. The answer key 320 corresponds to an answering instruction, the ignore key 320 corresponds to a rejection instruction, and the send message key 340 corresponds to a short message writing instruction.

When the processing module 140 determines that the input instruction is the answering instruction, as shown in step 241, the processing module 140 puts the incoming call through so as to provide the user to communicate with the calling party. When the user wants to end the communication, it is also possible to press an end button (not shown) on the communication device 100, so as to send a communication end instruction to the processing module 140. As shown in step 242, after receiving the communication end instruction, the processing module 140 may end the previously put-through incoming call, so as to finish the handling of the incoming call.

However, as shown in step 243, when the user does not want to answer the incoming call and presses the ignore key 320, the processing module 140 may correspondingly receive the rejection instruction. Here, the processing module 140 directly ends the incoming call, so as to accordingly finish the handling of the incoming call.

In addition, when the user presses the send message key 340, the processing module 140 may receive the short message writing instruction. As shown in step 245, the processing module 140 informs the short message editing module 150 to display the short message editing frame on the screen 130. Accordingly, when being inconvenient to answer the incoming call, the user can establish the short message through the short message editing frame, and send the short message to the calling party (step 247). After the sending of the short message is completed, as shown in step 249, the processing module 140 exits the short message editing frame. In another embodiment, after entering the short message editing frame, the user may also directly exit the short message editing frame without editing any short message. Once leaving the short message editing frame, the processing module 140 finishes the handling of the incoming call. In another embodiment, after the processing module 140 determines that the received instruction is the short message writing instruction, the short message editing module 150 is controlled to display the short message editing frame. Accordingly, the processing module 140 finishes the handling of the incoming call.

Next, in step 250, the processing module 140 starts to count the idle time of the communication device 100 that receives no operation instruction. As shown in step 260, it is determined whether the idle time reaches the predefined value. If the idle time does not reach the predefined value, as shown in step 250, the action of counting the idle time is continued. However, when the idle time reaches the predefined value, as shown in step 270, the screen lock state switching module 110 switches the communication device 100 back to the screen lock state according to the order of the processing module 140. That is to say, if the user does not perform any operation on the communication device 100 in a specific time (i.e., the idle time reaches the predefined value) after the incoming call is handled, the communication device 100 switches back to the screen lock state.

In another embodiment, after finishing the handling of the incoming call, the processing module 140 may not count the idle time, and immediately orders the screen lock state switching module 110 to switch the communication device 100 back to the screen lock state. Accordingly, the possibility of mis-touching the screen 130 to unwittingly activate the function can be decreased.

It should be noted that the method for handling an incoming call in a screen lock state may be executed on the communication device having a processor. In other words, the embodiment is designed to be the computer program including a plurality of program codes, and the computer program is recorded by using computer accessible recording medium (such as an optical disk, a floppy disc, and a removable hard disk). After the computer program is loaded to the communication device, it is possible to execute the method for handling an incoming call in a screen lock state of the embodiment on the communication device.

To sum up, in the method for handling an incoming call in a screen lock state, the communication device, and the recording medium of the present invention, when the communication device in the screen lock state receives the incoming call, it exits the screen lock state and displays the full-screen incoming call frame, thus being convenient for the user to inspect and handle the incoming call. After the handling of the incoming call is finished, it is also possible to switch the communication device back to the screen lock state. Accordingly, not only a convenient mechanism is provided to make the user handle the incoming call in the screen lock state, but also the mis-touching on the screen to activate other functions after the communication is ended may be avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for handling an incoming call in a screen lock state, applicable to a communication device comprising a screen, comprising:

entering a screen lock state;

receiving an incoming call;

leaving the screen lock state and displaying an incoming call frame;

handling the incoming call according to an input instruction;

counting an idle time of the communication device that receives no operation, after finishing a handling of the incoming call; and returning to the screen lock state, when the idle time reaches a predefined value.

2. The method for handling an incoming call in a screen lock state according to claim 1, wherein the incoming call frame is a full screen frame and comprises an incoming call information.

3. The method for handling an incoming call in a screen lock state according to claim 2, wherein the incoming call information at least comprises one of a calling party image, a calling party name, and an incoming call number.

4. The method for handling an incoming call in a screen lock state according to claim 1, wherein the screen comprises a touch screen, and after the step of displaying the incoming call frame, the method further comprises:

receiving the input instruction through the touch screen.

5. The method for handling an incoming call in a screen lock state according to claim 1, wherein the step of handling the incoming call according to the input instruction comprises:

putting the incoming call through, if the input instruction is an answering instruction.

6. The method for handling an incoming call in a screen lock state according to claim 5, wherein after the step of putting the incoming call through, the method further comprises:

receiving a communication end instruction; and ending the incoming call to finish the handling of the incoming call.

7. The method for handling an incoming call in a screen lock state according to claim 1, wherein the step of handling the incoming call according to the input instruction comprises:

ending the incoming call to finish the handling of the incoming call if the input instruction is a rejection instruction.

8. The method for handling an incoming call in a screen lock state according to claim 1, wherein the step of handling the incoming call according to the input instruction comprises:

entering a short message editing frame, if the input instruction is a short message writing instruction; and leaving the short message editing frame, so as to finish the handling of the incoming call.

9. The method for handling an incoming call in a screen lock state according to claim 8, wherein after the step of entering the short message editing frame further comprising:

establishing a short message through the short message editing frame; and sending the short message to a calling party of the incoming call.

10. The method for handling an incoming call in a screen lock state according to claim 1, wherein the step of handling the incoming call according to the input instruction comprises:

entering a short message editing frame to finish the handling of the incoming call, if the input instruction is a short message writing instruction.

11. The method for handling an incoming call in a screen lock state according to claim 1, further comprising:

directly returning to the screen lock state, after finishing the handling of the incoming call.

12. A communication device, comprising:

a screen lock state switching module, for switching a screen lock state of the communication device;

an incoming call receiving module, for receiving an incoming call;

a screen, for displaying an incoming call frame; and a processing module, coupled to the screen lock state switching module, the incoming call receiving module, and the screen, for ordering the screen lock state switching module to make the communication device exit the screen lock state, displaying the incoming call frame, and handling the incoming call according to an input instruction, when the communication device in the screen lock state receives the incoming call, wherein after finishing a handling of the incoming call, the processing module counts an idle time of the communication device that receives no operation, such that when the idle time reaches a predefined value, the processing module orders the screen lock state switching module to make the communication device enter the screen lock state.

13. The communication device according to claim 12, wherein the incoming call frame is a full screen frame and comprises an incoming call information.

14. The communication device according to claim 13, wherein the incoming call information at least comprises at least one of a calling party image, a calling party name, and an incoming call number.

15. The communication device according to claim 12, wherein the screen comprises a touch screen for receiving the input instruction.

16. The communication device according to claim 12, wherein the processing module puts the incoming call through if the input instruction is determined as an answering instruction.

17. The communication device according to claim 16, wherein the processing module ends the put-through incoming call when receiving a communication end instruction, so as to finish the handling of the incoming call.

18. The communication device according to claim 12, wherein the processing module ends the incoming call if the input instruction is determined as a rejection instruction, so as to finish the handling of the incoming call.

19. The communication device according to claim 12, further comprising:
- a short message editing module, coupled to the processing module, for switching and displaying a short message editing frame on the screen,
- wherein the processing module makes the short message editing module display the short message editing frame if the the input instruction is determined as a short message writing instruction, and finishes the handling of the incoming call when leaving the short message editing frame.

20. The communication device according to claim 19, wherein the short message editing module is used for establishing a short message, and sending the short message to a calling party of the incoming call.

21. The communication device according to claim 19, wherein the processing module makes the short message editing module display the short message editing frame if the input instruction is determined as a short message writing instruction, so as to finish the handling of the incoming call.

22. The communication device according to claim 12, wherein the processing module immediately orders the screen lock state switching module to make the communication device enter the screen lock state after finishing the handling of the incoming call.

23. A recording medium, for recording a computer program, wherein the computer program comprises a plurality of program codes, for being loaded to a communication device comprising a screen to make the communication device execute a method for handling an incoming call in a screen lock state, and the method comprising:
- entering a screen lock state;
- receiving an incoming call;
- leaving the screen lock state and displaying an incoming call frame;
- handling the incoming call according to an input instruction;
- counting an idle time of the communication device that receives no operation, after finishing a handling of the incoming call; and
- returning to the screen lock state, when the idle time reaches a predefined value.

* * * * *